(12) United States Patent
Fuss et al.

(10) Patent No.: US 9,033,580 B2
(45) Date of Patent: May 19, 2015

(54) FLUID DYNAMIC BEARING SYSTEM

(71) Applicant: MINEBEA CO., LTD., Nagano-Ken (JP)

(72) Inventors: Thomas Fuss, Rottweil (DE); Martin Engesser, Donaueschingen (DE); Atsushi Yanagawa, Nagano (JP); Werner Schmid, Wurmlingen (DE); Carsten Etling, Denkingen (DE)

(73) Assignee: MINEBEA CO., LTD., Nagano-Ken (JP)

( * ) Notice: Subject to any disclaimer, the term of this patent is extended or adjusted under 35 U.S.C. 154(b) by 0 days.

(21) Appl. No.: 14/095,532

(22) Filed: Dec. 3, 2013

(65) Prior Publication Data

US 2014/0093197 A1    Apr. 3, 2014

Related U.S. Application Data

(63) Continuation of application No. 12/590,967, filed on Nov. 17, 2009, now Pat. No. 8,613,552.

(30) Foreign Application Priority Data

Nov. 18, 2008 (DE) .......................... 10 2008 057 873
May 5, 2009 (DE) .......................... 10 2009 019 936

(51) Int. Cl.
*F16C 32/06* (2006.01)
*F16C 33/10* (2006.01)
*F16C 33/74* (2006.01)
*F16C 17/10* (2006.01)

(52) U.S. Cl.
CPC ......... *F16C 32/0633* (2013.01); *F16C 33/1085* (2013.01); *F16C 33/745* (2013.01); *F16C 17/107* (2013.01); *F16C 2370/12* (2013.01)

(58) Field of Classification Search
CPC ............................ F16C 32/745; F16C 17/107
USPC .................. 384/100, 107, 114, 119, 130–132
See application file for complete search history.

(56) References Cited

U.S. PATENT DOCUMENTS

| 6,890,104 | B2 | 5/2005 | Gomyo |
| 7,168,463 | B2 | 1/2007 | Misu |
| 7,650,697 | B2 | 1/2010 | Gomyo |
| 2006/0291757 | A1 | 12/2006 | LeBlanc |
| 2007/0133911 | A1 | 6/2007 | Nishimoto |
| 2008/0260310 | A1 | 10/2008 | Bauer |
| 2008/0273822 | A1 | 11/2008 | Le |
| 2009/0079283 | A1 | 3/2009 | LeBlanc |
| 2009/0140588 | A1 | 6/2009 | Drautz |

FOREIGN PATENT DOCUMENTS

| AT | 504155 | 3/2008 |
| DE | 102006020408 | 11/2007 |
| DE | 102008017220 | 10/2008 |

(Continued)

*Primary Examiner* — Thomas R. Hannon
(74) *Attorney, Agent, or Firm* — Cooper & Dunham LLP

(57) ABSTRACT

The fluid dynamic bearing system has at least one stationary part, and at least one rotating part that is supported rotatable about a rotational axis with respect to the stationary part. A bearing gap filled with bearing fluid is formed between mutually opposing surfaces of the stationary and of the rotating part. The bearing system includes at least one fluid dynamic radial bearing and at least one fluid dynamic axial bearing that are disposed along sections of the bearing gap. In one aspect of the invention, an annular sealing gap for sealing open ends of the bearing gap has one end connected to the bearing gap and one end connected to an annular reservoir, the outside radius of the reservoir measured from the rotational axis being larger than the outside radius of the sealing gap.

17 Claims, 13 Drawing Sheets

(56) References Cited

FOREIGN PATENT DOCUMENTS

| | | |
|---|---|---|
| DE | 102008052469 | 6/2009 |
| JP | 2001165153 | 6/2001 |
| JP | 2001263343 | 9/2001 |
| JP | 2002174243 | 6/2002 |
| JP | 2005069491 | 3/2005 |
| JP | 2008008312 | 1/2008 |
| JP | 2009264320 | 11/2009 |

Detail X

Detail X

Detail X

Detail X

Detail X

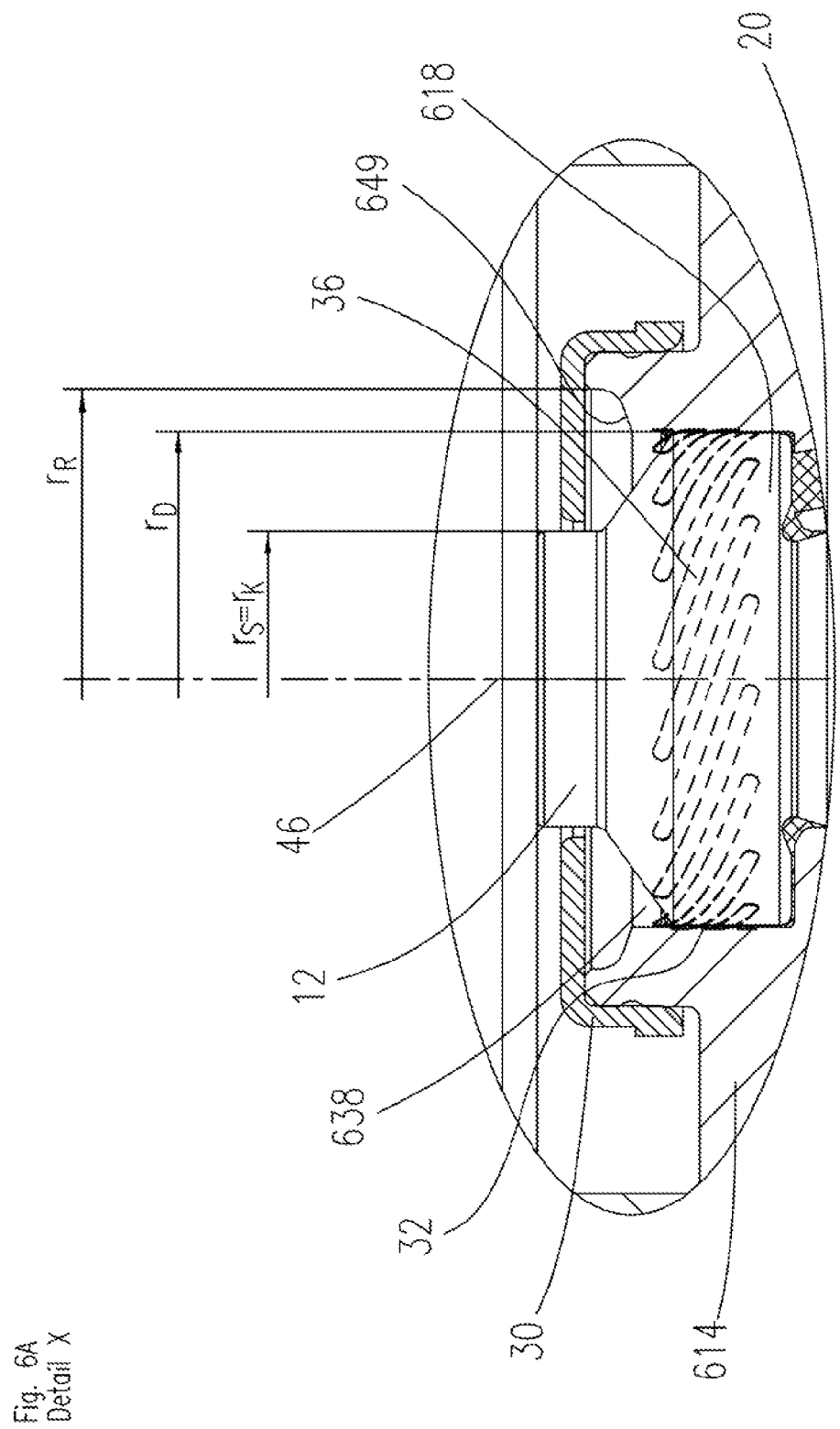

FLUID DYNAMIC BEARING SYSTEM

CROSS-REFERENCE TO RELATED APPLICATION

This application is a continuation of U.S. Ser. No. 12/590,967, filed Nov. 17, 2009, the entire content of which is hereby incorporated by reference.

BACKGROUND OF THE INVENTION

The invention relates to a fluid dynamic bearing system, used preferably for the rotatable support of a spindle motor. Spindle motors supported in this way are used, for example, for driving hard disk drives.

DESCRIPTION OF THE PRIOR ART

A fluid dynamic bearing system generally comprises at least two bearing parts that are rotatable with respect to one another and that form a bearing gap filled with a bearing fluid, such as bearing oil, between associated bearing surfaces. Bearing patterns that are associated with the bearing surfaces and that act on the bearing fluid are provided using a well-known method. In a fluid dynamic bearing, the bearing patterns taking the form of grooved patterns are formed as depressions or raised areas usually on one or on both bearing surfaces. The bearing patterns act as bearing and/or pumping patterns that generate hydrodynamic pressure within the bearing gap when the bearing parts rotate with respect to one another and that gives the bearing its load-carrying capacity. Compared to ball bearings, fluid dynamic bearings possess greater running precision and running smoothness and very much higher shock resistance. They operate practically free of noise and wear since, under normal operating conditions, there is no direct physical contact between the bearing surfaces.

Spindle motors having a fluid dynamic bearing system can essentially be divided into two different groups, that is to say, into two different designs: motors having a rotating shaft and a bearing gap that is usually open at only one end and motors having a stationary shaft and a bearing gap open at both ends. A significant advantage afforded by motors of the second group is the possibility of firmly fixing the stationary shaft not only at one end but at both ends as well to the housing or baseplate. These types of motors thus achieve appreciably greater structural stiffness compared to motors having a shaft fixed at only one end.

Irrespective of the type of construction, it is necessary to introduce bearing fluid into the bearing gap when the bearing is being assembled. The introduction of bearing fluid into the bearing gap is quite complex, because the bearing gap is only a few micrometers wide. Various methods of introducing bearing fluid into a fluid dynamic bearing are known from the prior art.

AT 504155A2 discloses a method for filling a bearing gap with bearing fluid that is suitable for bearing gaps open at one end. Here, the bearing is filled with bearing fluid in a working area subjected to negative pressure in that a filling device is used to introduce bearing fluid into the region of the open end of the bearing gap under the prevailing negative pressure. Air is then reintroduced into the working area so that, due to the prevailing negative pressure in the bearing gap, the bearing fluid is sucked into the bearing gap.

This method can also be used for bearing gaps open at both ends in that the bearing gap is evacuated in a working area and bearing fluid is applied from both sides to the open ends of the bearing gap, the bearing fluid then being forced into the bearing gap when air is reintroduced into the working area. In the case of bearings open at both ends, however, it is consistently difficult to introduce the bearing fluid into the region of the open ends of the bearing using an appropriate dosing device. In particular, the region of the lower open end of the bearing gap is mostly hidden under the hub or bearing bush and thus hard to reach. Because the lower bearing gap opening is difficult to reach, there is the risk of contamination of the bearing with bearing fluid during filling.

For example, JP 2005069491A discloses such a method for filling a bearing gap open at both ends. Since a sealing ring that comes into contact with the bearing fluid is used, possible contamination of the surfaces of the bearing cannot be ruled out. In addition, the sealing ring has to be cleaned after each filling process.

SUMMARY OF THE INVENTION

It is the object of the invention to provide a fluid dynamic bearing that is constructed so as to allow bearing fluid to be easily and reliably filled into the bearing gap.

This object has been achieved according to the invention by the disclosed fluid dynamic bearing, Preferred embodiments of the invention and further advantageous characteristics are revealed in the subordinate claims.

The fluid dynamic bearing system has at least one stationary part and at least one rotating part that is supported rotatable about a rotational axis with respect to the stationary part. A bearing gap filled with bearing fluid is formed between the mutually opposing surfaces of the stationary and the rotating part. The bearing system comprises at least one fluid dynamic radial bearing and at least one fluid dynamic axial bearing that are disposed along sections of the bearing gap. Moreover, sealing means for sealing the open ends of the bearing gap are provided. According to the invention, one of the sealing means comprises an annular sealing gap that has one end connected to the bearing gap and one end connected to an annular reservoir. The reservoir has an outside radius measured from the rotational axis that is larger than the radius of the sealing gap.

According to the invention, a reservoir for receiving bearing fluid is thus provided between the stationary and the rotating part. This reservoir is not to be confused with the much smaller "reservoir" formed by the sealing gap or a tapered widening of the sealing gap. In terms of volume, the reservoir is constructed such that it can hold the entire amount of bearing fluid that is used in the bearing. This large reservoir volume makes it possible for the bearing fluid to be introduced at one go, the reservoir being so large that during filling no bearing fluid is able to reach the neighboring components of the bearing and soil them.

The edges of the reservoir or the adjoining surfaces of the bearing may additionally be provided with a barrier film to prevent these surfaces from being moistened with bearing fluid.

In a preferred embodiment of the invention, the reservoir has an inside radius, measured from the rotational axis, wherein the inside radius is equal to or smaller than the inside radius of the sealing gap.

This preferred embodiment of the invention matches the equation:

$$r_S <= r_K < r_D < r_R$$

According to the invention, the bearing to be filled is thus put in position and the entire amount of bearing fluid to be filled in is fed into the reservoir. The bearing can subsequently be removed from the filling device and the bearing fluid found in the filling reservoir can then slowly travel by means of capillary action right through the sealing gap into the bearing gap. This process can take well over ten minutes. The advantage here is that the actual filling process for filling the bearing fluid into the reservoir is very fast and the bearing can then be removed from the filling device and placed at rest where the bearing fluid can fully migrate into the bearing gap. In a preferred embodiment of the invention, the surfaces that border the filling reservoir are slanting surfaces that facilitate the bearing fluid to flow into the sealing gap and from there to the bearing gap. Due to the slanting surfaces of the filling reservoir, no bearing fluid remains in the reservoir region.

The reservoir is thus filled only once, namely when the bearing system is being filled with bearing fluid, whereas at other times it is free of bearing fluid since it is located outside the sealing region of the bearing.

The sealing gap, which is disposed between the reservoir and the bearing gap, forms a capillary seal that prevents leakage of bearing fluid from the bearing gap back into the reservoir. The sealing gap may comprise a tapered capillary seal, i.e. it may have a region that widens into a taper. In addition to the capillary seal, the sealing means may comprise a dynamic pumping seal that is marked by pumping patterns disposed on the stationary or on the rotating bearing part.

The transition between the outside radius of the sealing gap and the outside radius of the reservoir is preferably made at an angle greater than 45°. The sealing gap thus widens significantly on transition to the reservoir.

The stationary part preferably comprises a first bearing part, a shaft accommodated in the first bearing part and a second, annular bearing part disposed on the shaft, the two bearing parts being disposed at a mutual spacing on the shaft. The rotating part preferably comprises a bearing bush, or a hub having an integrated bearing bush, that is rotatably disposed on the shaft between the two bearing parts.

The bearing preferably comprises at least two fluid dynamic radial bearings formed by mutually adjacent surfaces of the shaft and the bearing bush or hub respectively that are separated from one another by the bearing gap. The fluid dynamic axial bearing is formed by mutually opposing surfaces of the end face of the first bearing part and the bearing bush.

To ensure the necessary circulation of bearing fluid in the bearing gap, a recirculation channel filled with bearing fluid is provided that connects remote sections of the bearing gap to one another. The recirculation channel preferably connects the sections of the bearing gap adjoining the respective sealing means to each other.

The fluid dynamic bearing system according to the invention can be provided as a part of a spindle motor, the motor having a stator and a rotor that is rotatably supported by means of the bearing system. An electromagnetic drive system is used as the drive.

Preferred embodiments of the invention are described in more detail below on the basis of the drawings. Further characteristics and advantages of the invention can be derived from the drawings and the following description.

DESCRIPTION OF PREFERRED
EMBODIMENTS OF THE INVENTION

Figure 1:
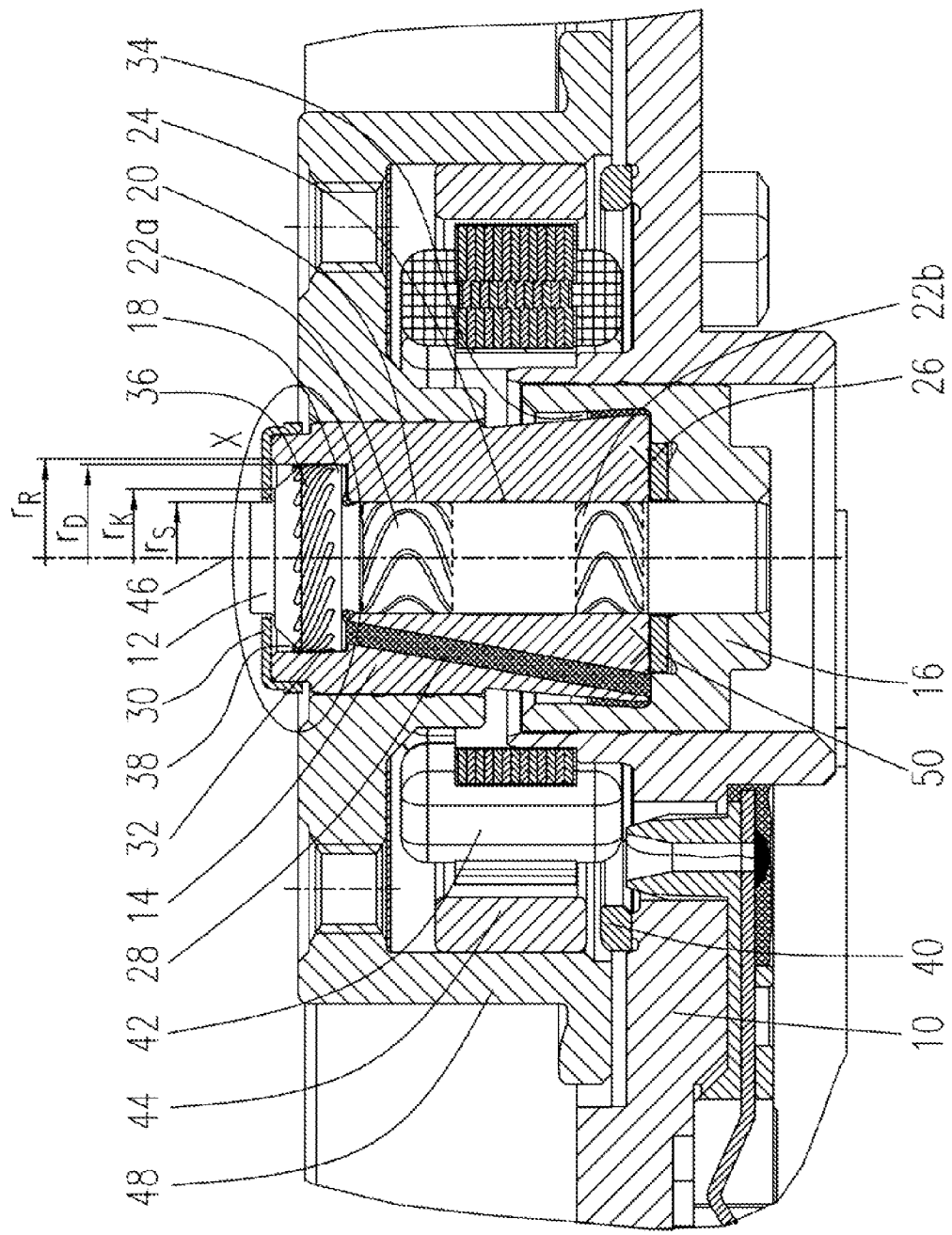
FIG. 1: shows a section through a spindle motor having a first embodiment of the fluid dynamic bearing system
Figure 1A:
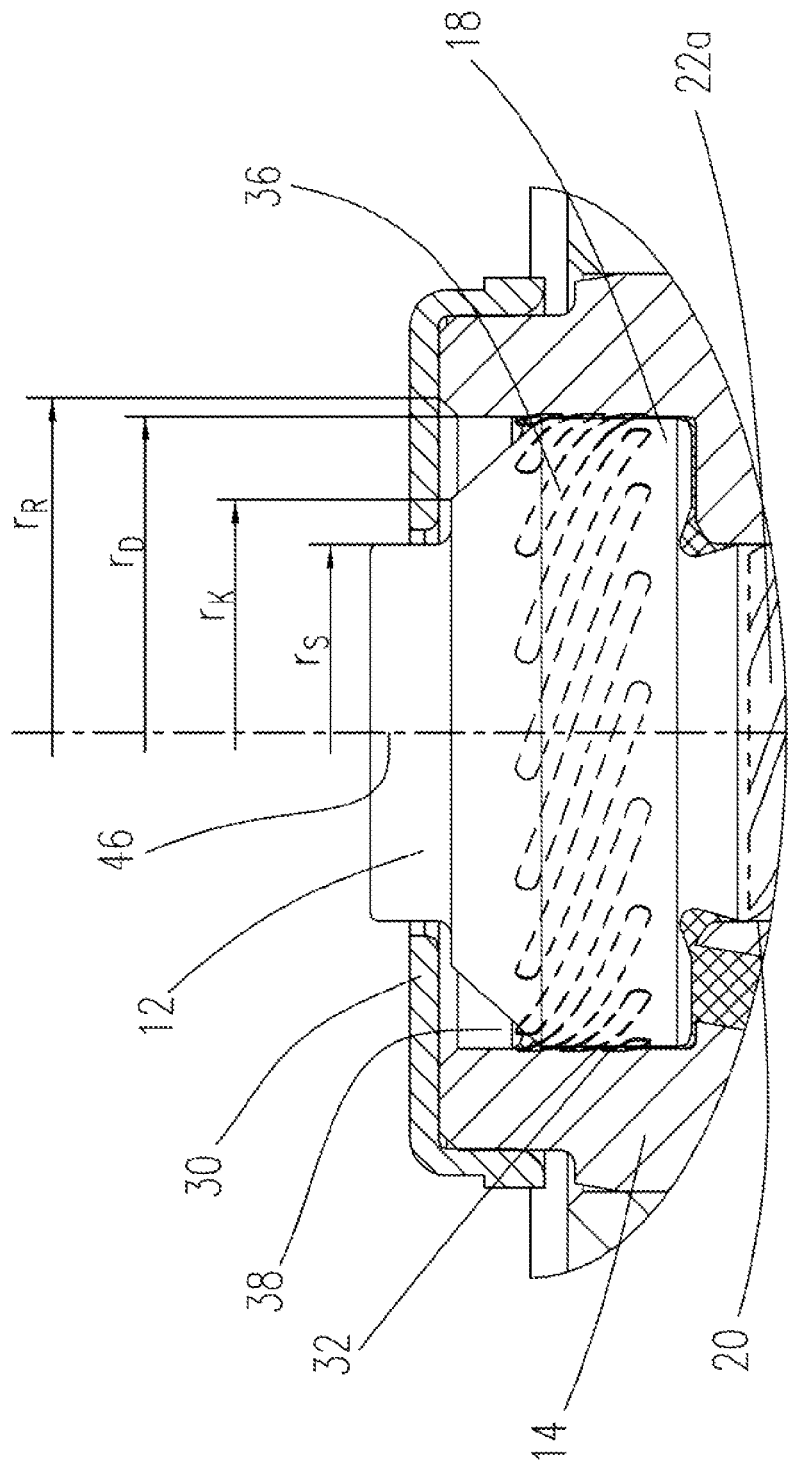
FIG. 1A: shows an enlarged view of region x in FIG. 1
FIG. 2: shows a section through a spindle motor having a second embodiment of the fluid dynamic bearing system

FIGS. 1 and 1A show a spindle motor having a fluid dynamic bearing according to the invention. This kind of spindle motor may be used for driving the storage disks of a hard disk drive.

The spindle motor comprises a baseplate 10 that has a substantially cylindrical central opening in which a first bearing part 16 is accommodated. The first bearing part 16 is approximately cup-shaped in form and comprises a central opening in which a shaft 12 is fixed. At the free end of the stationary shaft 12, a second bearing part 18 is disposed that is preferably annular in shape and integrally formed with the shaft 12 as one piece. The said parts 10, 12, 16 and 18 form the stationary components of the spindle motor. At its top end, the shaft 12 has a tapped hole for attachment to a housing cover of the spindle motor or of the hard disk drive. The bearing comprises a bearing bush 14 that is disposed in a space formed by the shaft 12 and the two bearing parts 16, 18 and is rotatable with respect to these parts. The upper bearing part 18 is disposed in an annular recess in the bearing bush 14. Mutually adjacent surfaces of the shaft 12, the bearing bush 14 and the bearing parts 16, 18 are separated from one another by a bearing gap 20 open at both ends, the bearing gap being filled with a bearing fluid, such as bearing oil. The electromagnetic drive system of the spindle motor is formed in a well-known manner by a stator arrangement 42 disposed on the baseplate 10 and an annular permanent magnet 44 enclosing the stator arrangement at a spacing, the annular permanent magnet 44 being disposed on an inner circumferential surface of the hub 48, in principle, it is also possible to form the hub and the bearing bush integrally as one piece.

The bearing bush 14 has a cylindrical bore on whose inside circumference two cylindrical radial bearing surfaces are formed that are separated by a separator gap 24 running in between. These bearing surfaces enclose the stationary shaft 12 at a distance of only a few micrometers, at the same time forming an axially extending section of the bearing gap 20 and are provided with appropriate grooved patterns, so that, together with the respective opposing bearing surfaces of the shaft 12, they form two fluid dynamic radial bearings 22a and 22b. As an alternative, the separator gap may also be formed in the shaft.

A radially extending section of the bearing gap 20 adjoins the lower radial bearing 22b, the radially extending section being formed by radially extending bearing surfaces of the bearing bush 14 and respective opposing bearing surfaces of the first bearing part 16. These bearing surfaces form a fluid dynamic axial bearing 26 taking the form of an annulus perpendicular to the rotational axis 46. The fluid dynamic axial bearing 26 is marked in a well-known manner by bearing grooves, such as spiral-shaped bearing grooves, that may be disposed either on the end face of the hearing bush 14, on the first bearing part 16 or on both parts. The bearing grooves of the axial bearing 26 preferably extend over the entire end. face of the bearing bush 14, in other words from the inner rim right up to the outer rim. This goes to produce a defined distribution of pressure in the entire axial bearing gap, and negative pressure zones are avoided since fluid pressure increases continuously from a radially outer to a radially inner position of the axial bearing. It is advantageous if all the grooved patterns required for the radial bearings 22a, 22b, the axial bearing 26 and, where applicable, the pumping seal 36 are disposed. on the bearing bush 14, thus simplifying the manufacture of the bearing, particularly the manufacture of the shaft 12 and bearing part 16. In the region of the first bearing part 16, a separate bearing disk 50 may be inserted. This bearing disk 50 may have, for example, a special coating, such as a hard coating.

A sealing gap 34 proportionally filled with bearing fluid adjoins the radial section of the bearing gap 20 in the region of the axial bearing 26, the sealing gap 34 being formed by the mutually opposing surfaces of the hearing bush 14 and the first bearing part 16 and sealing the end of the fluid bearing system at this end. The sealing gap 34 comprises a radially extending section, which is wider than the bearing gap 20 that merges into an almost axially extending section opening up into a taper that is defined by an inner circumferential surface of the bearing bush 14 and an outer circumferential surface of the bearing part 16. Alongside its function as a capillary seal, the sealing gap 34 also acts as a fluid reservoir and supplies the amount of fluid necessary for the useful if of the bearing. Moreover, filling tolerances and any thermal expansion of the bearing fluid can be compensated.

At the other end of the fluid bearing system, the bearing bush 14 adjoining the upper radial bearing 22a is designed such that it has a radially extending surface that, together with a corresponding opposing surface of the second bearing part 18, forms a radial gap. An axially extending sealing gap 32 adjoins the radial gap, the axially extending sealing gap 32 sealing the fluid bearing system at this end. The sealing gap 32 preferably comprises a pumping seal 36 and widens at the outer end preferably forming a tapered cross-section. The sealing gap 32 is defined by mutually opposing surfaces of the bearing bush 14 and the bearing part 18.

The sealing gap 32 or the tapered end of the sealing gap widens once again towards the outside so that an annular reservoir 38 is formed whose outside radius $r_R$ is larger than the outside radius $r_D$ of the sealing gap 32. In a particular preferred embodiment of the invention, the annular reservoir 38 has also an inside radius $r_S$ that is smaller than the inside radius $r_K$ of the sealing gap, so that $r_S < r_K < r_D < r_R$.

The reservoir 38 is free of bearing fluid and is only needed for filling the bearing with bearing fluid. When the bearing is being filled with bearing fluid, the reservoir 38 as well as the tapered section of the sealing gap 32 is filled with the entire amount of bearing fluid required for the bearing. Through capillary action, the bearing fluid now travels through the sealing gap 32 into the bearing gap 20 right down to the sealing gap 34 at the other end of the bearing gap. No bearing fluid subsequently remains in the reservoir 38 nor in the regions of the tapered section of the sealing gap 32 adjoining the reservoir.

The bearing or the reservoir 38 is covered by an annular cover 30. The cover 30 is put over an end rim of the bearing bush 14 and attached there, for example, by bonding, pressing and/or welding. The inner circumference of the cover 30 may form a gap seal together with the opposing outside circumference of the shaft 12. This goes to increase the certainty that no bearing fluid can leak out of the sealing gap 32 or the reservoir 38.

Since the spindle motor has only one fluid dynamic axial bearing 26 that generates a force in the direction of the second bearing part 18, a corresponding counterforce or preload force has to be provided at the rotating bearing part, the counterforce keeping the bearing system in axial balance. For this purpose, the baseplate 10 may have a ferromagnetic ring 40 that lies axially opposite the rotor magnet 44 and that is magnetically attracted by the rotor magnet 44. This magnetic force of attraction acts in opposition to the force of the axial bearing 26 and keeps the bearing axially stable. As an alternative or in addition to this solution, the stator arrangement 42 and the rotor magnet 44 may be disposed at an axial offset with respect to one another in such a way that the magnetic center of the rotor magnet 44 is disposed axially further away from the baseplate 10 than the magnetic center of the stator arrangement 42. Through the magnetic system of the motor, an axial force is thereby built up that acts in opposition to the axial bearing 26.

To ensure continuous flushing of the bearing system with bearing fluid, a recirculation channel 28 is provided in a well-known manner. According to the invention, the recirculation channel 28 is formed as an axially extending or slightly slanting channel in the bearing bush 14, which is preferably disposed at an acute angle with respect to the rotational axis 46 of the bearing. The recirculation channel 28 connects the two radial sections of the bearing gap 20 between the bearing regions and the sealing regions directly to each other and preferably ends in the radially outer section of the axial bearing where the axial gap distance is larger than the part of the radial bearing gap that is disposed in the near vicinity of the shaft. Due to the directed pumping effect of the bearing groove patterns of the axial bearing 26 and the radial bearings 22a, 22b, there is a flow of bearing fluid in the bearing gap 20 preferably in the direction of the upper sealing gap 32. What is more, due to the effect of the centrifugal force, the bearing fluid in the recirculation channel 28 is transported downwards in the slanting channel in the direction of the axial bearing 26, thus producing a stable circulation of fluid.

Due to the centrifugal force that acts within the channel on the bearing fluid, it is sufficient if the lower radial bearing has asymmetric bearing patterns that have an overall upwards pumping effect, i.e. the lower branches of the radial bearing patterns are slightly longer than the upper branches of the radial bearing. The upper radial bearing may, in contrast, be made largely symmetric.

Figure 2:
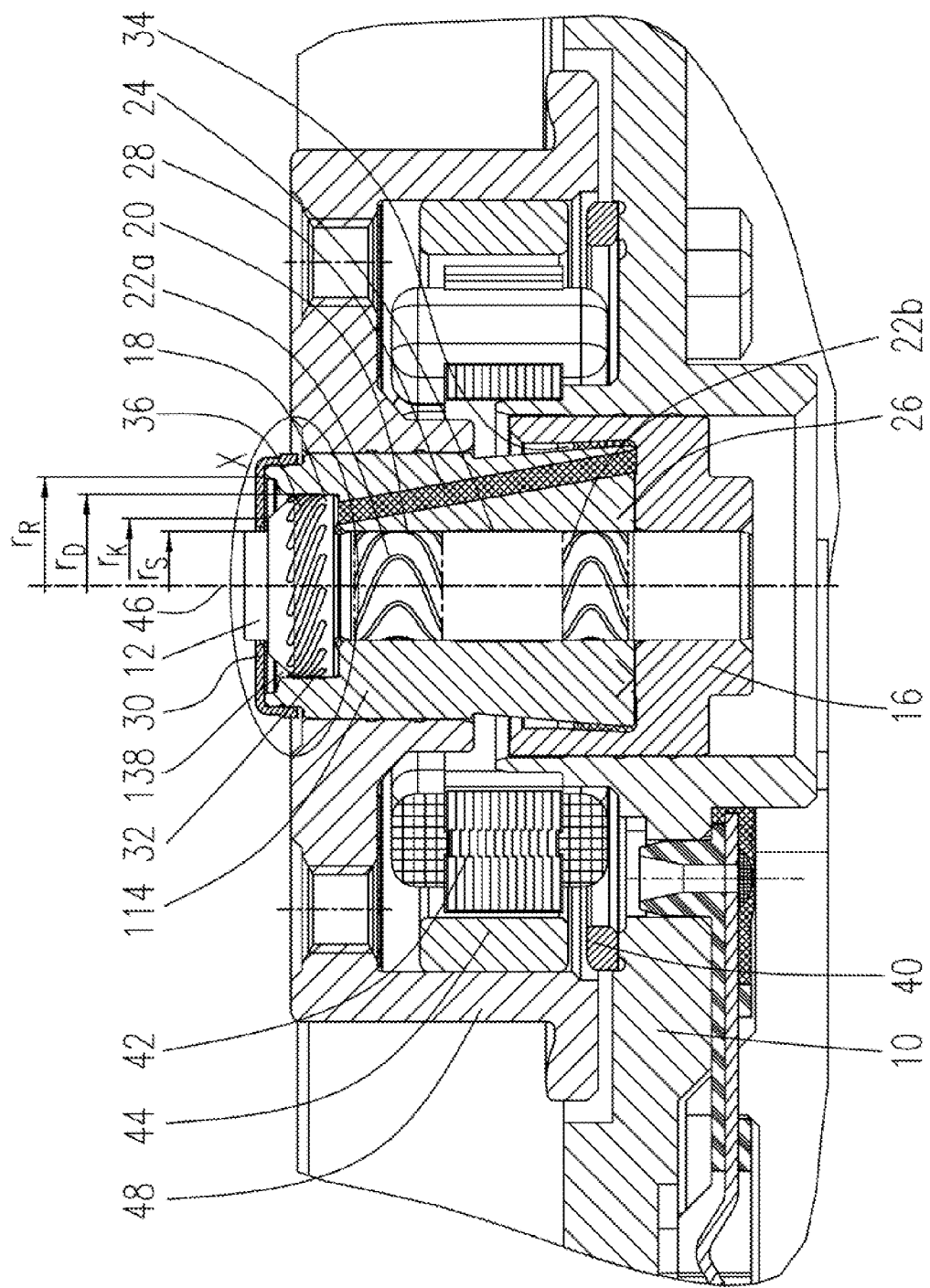
FIG. 2A: shows an enlarged view of region x in FIG. 2
FIG. 3: shows a section through a spindle motor having a third embodiment of the fluid dynamic bearing system
Figure 2A:
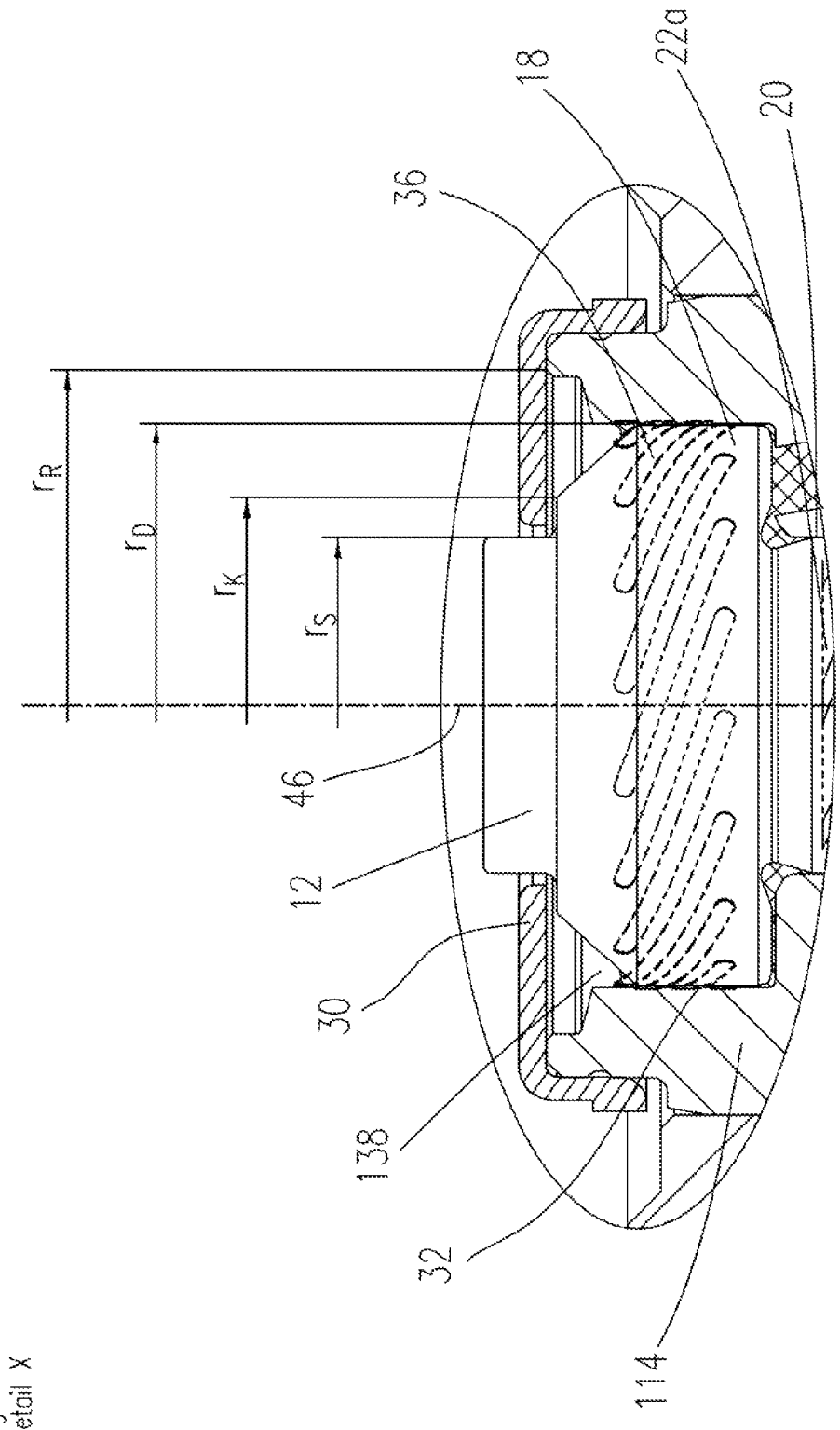

FIGS. 2 and 2A show an embodiment of a spindle motor having a fluid dynamic bearing that is modified vis-à-vis FIG. 1. Identical parts are indicated by the same reference numbers. For the basic particulars, the description from FIG. 1 applies.

In contrast to FIG. 1, the bearing surfaces of the axial bearing 26 do not have a separate bearing disk 50, but rather the bearing surface is directly formed by the bearing part 16.

Compared to FIG. 1, the reservoir 138 is made considerably larger and comprises a greater volume. This is achieved in that the bearing bush 114 has a recess at its upper edge having a larger outside diameter $r_R$, so that the overall volume of the reservoir 138 is increased. The advantage of this larger reservoir 138 is that it can hold a greater amount of bearing fluid, if required, and that bearing fluid cannot leak out as easily from the reservoir 138 when it is being filled.

Figure 3:
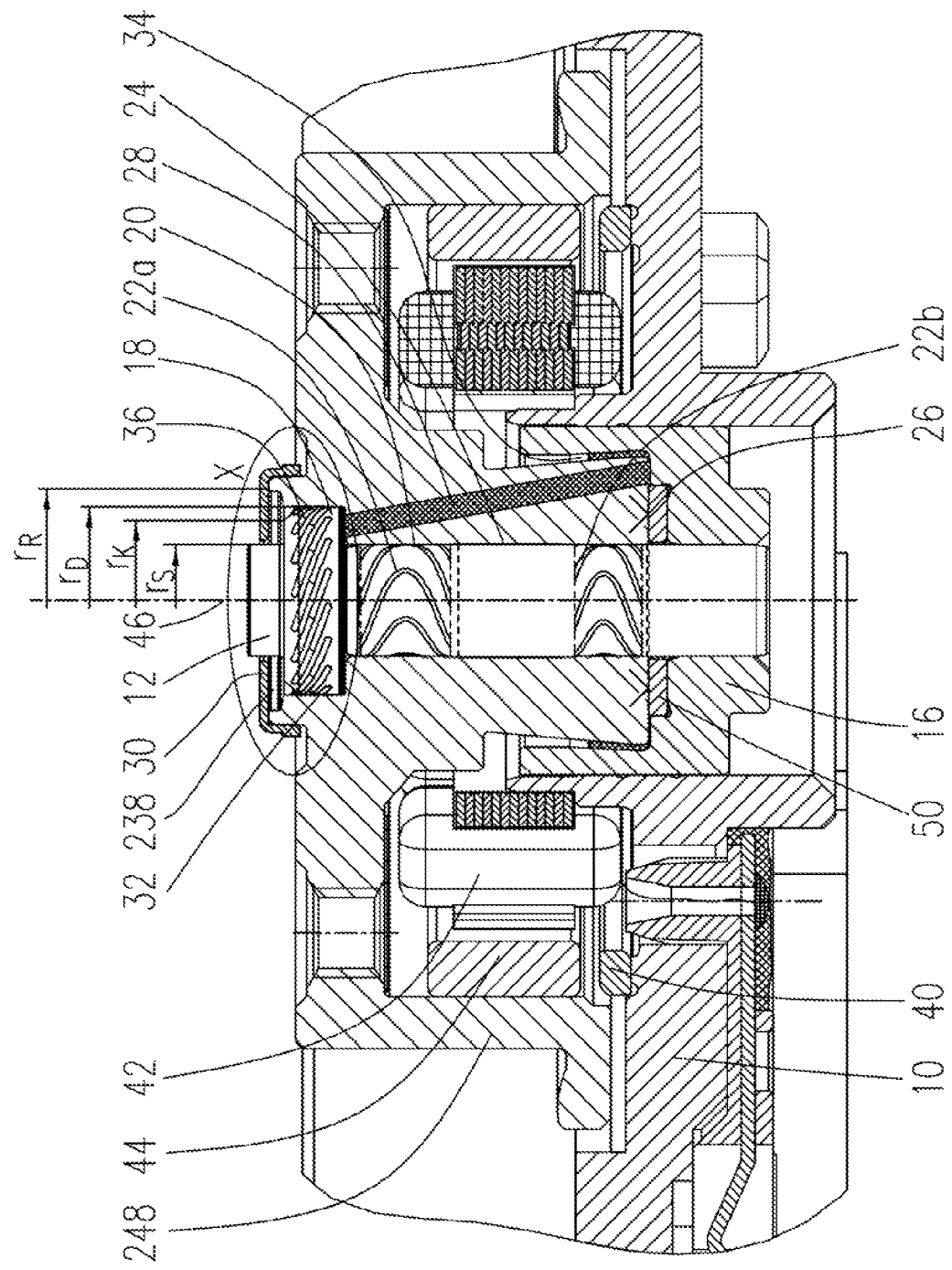
FIG. 3A: shows an enlarged view of region x in FIG. 3
FIG. 4: shows a section through a spindle motor having a fourth embodiment of the fluid dynamic bearing system
Figure 3A:
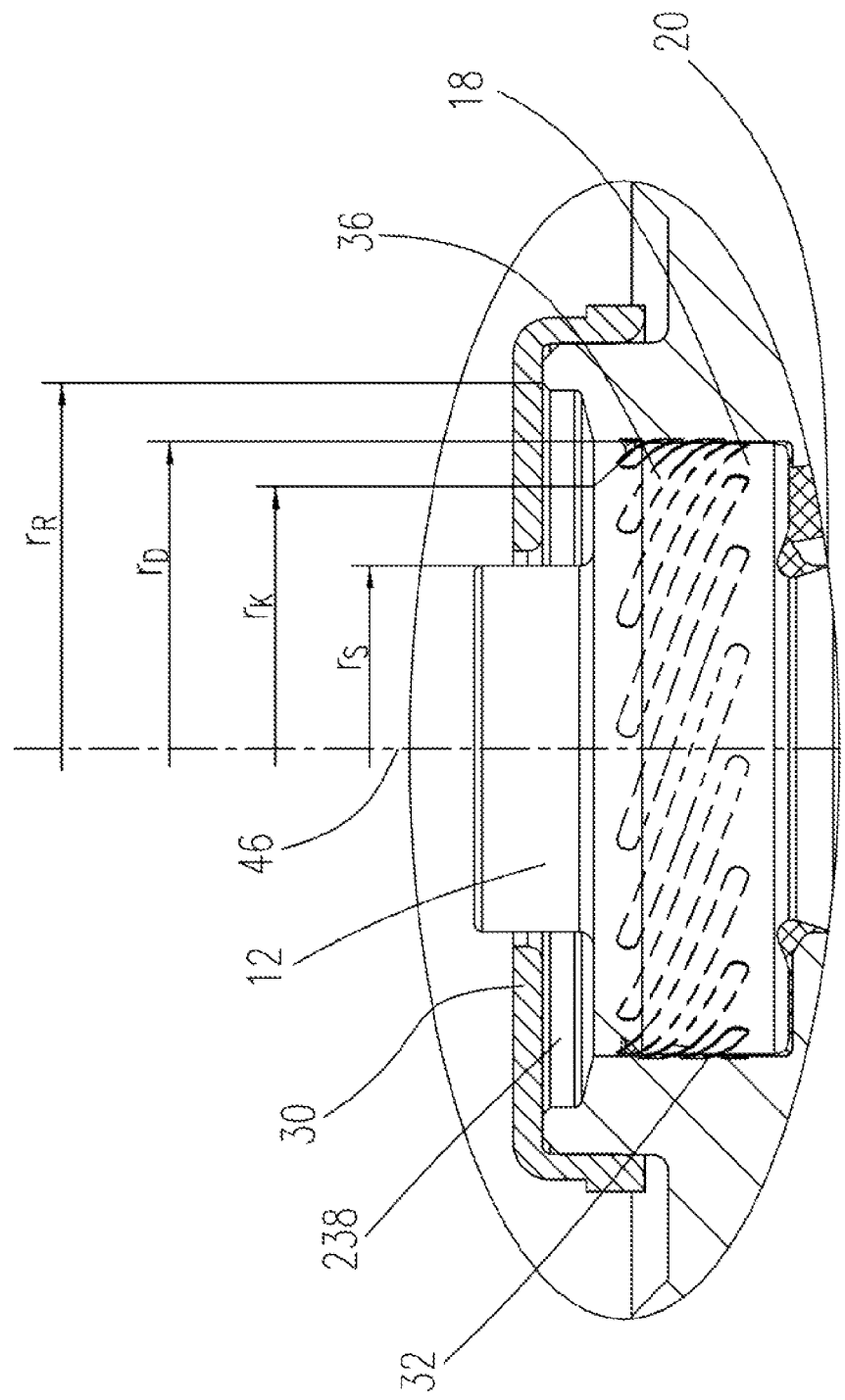

FIGS. 3 and 3A show another embodiment of a spindle motor having a bearing according to the invention that is modified vis-à-vis FIG. 1. Identical parts found in FIG. 1 are indicated by the same reference numbers. The description from FIG. 1 applies.

The first way in which the spindle motor of FIG. 3 differs from that of FIG. 1 is that the bearing bush now forms a part of the hub 248 The bearing bush is thus integrally formed with the hub 248 as one piece, whereas in FIGS. 1 and 2 they were two separate parts joined together. The shape of the shaft or of the bearing part 18 and the hub 248 or of the section of the hub that forms the bearing bush is different in the region of the reservoir 238 and the seal 32. Reservoir 238 has a shape approximately the same as that of reservoir 138 in FIG. 2. The volume is relatively large so that it can safely hold the required amount of bearing fluid when the bearing is being filled.

Figure 4:
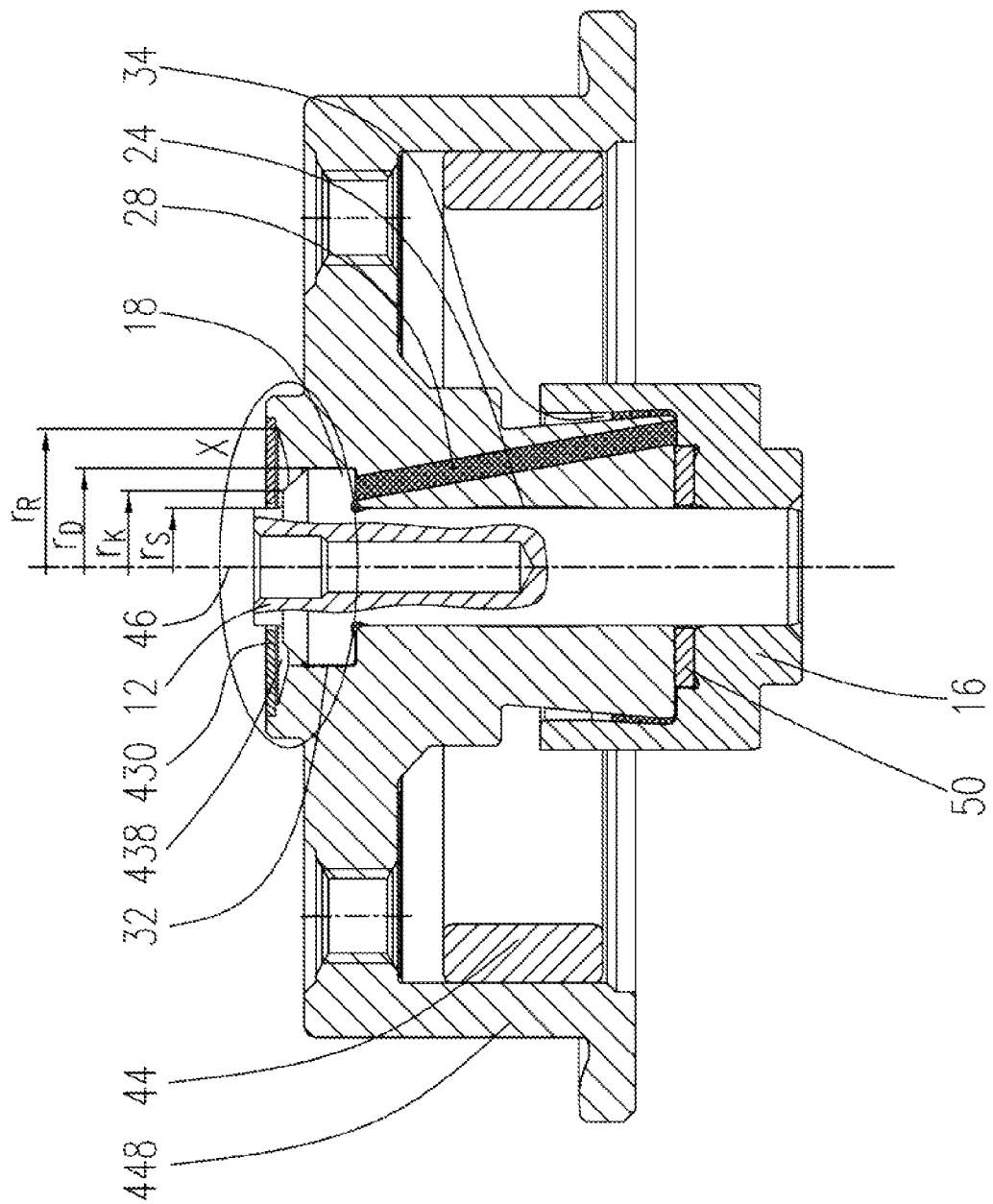
FIG. 4A: shows an enlarged view of region x in FIG. 4
FIG. 5: shows a section through a fluid dynamic bearing according to a fifth embodiment
Figure 4A:
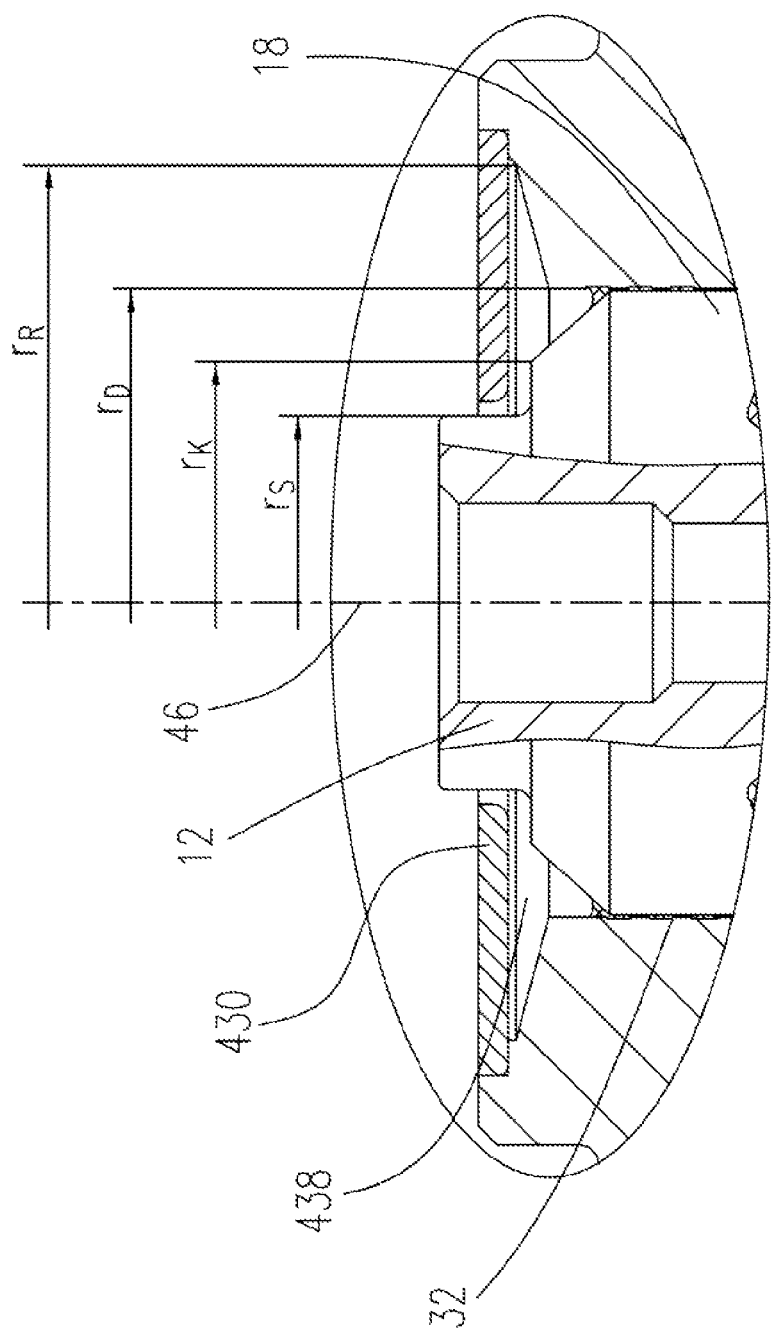

FIGS. 4 and 4A show a further embodiment of the invention where only the necessary bearing components are shown in section without the other components of the spindle motor. However, the corresponding reference numbers apply as well as the description of the parts from FIG. 1.

In contrast to FIG. 1, the hub 448 is again integrally formed with the bearing bush as one piece, a reservoir 438 being formed between the shaft or the bearing bush of the hub 448, the reservoir 438 having approximately the same shape as reservoir 138 from FIG. 2. in contrast to the preceding embodiments of the invention, the cover 430 is designed as a simple annular disk. The cover 430 is set in a recess in the hub 448 and covers the reservoir 438. In the preceding embodiments according to FIGS. 1 to 3, the cover was designed as a cap that was placed over the rim of the bearing bush.

The advantage of the disk-shaped cover cap 430 compared to the other caps lies in its ease of manufacture and machining and its flat design that makes it possible to reduce the overall height of the motor.

Figure 5:
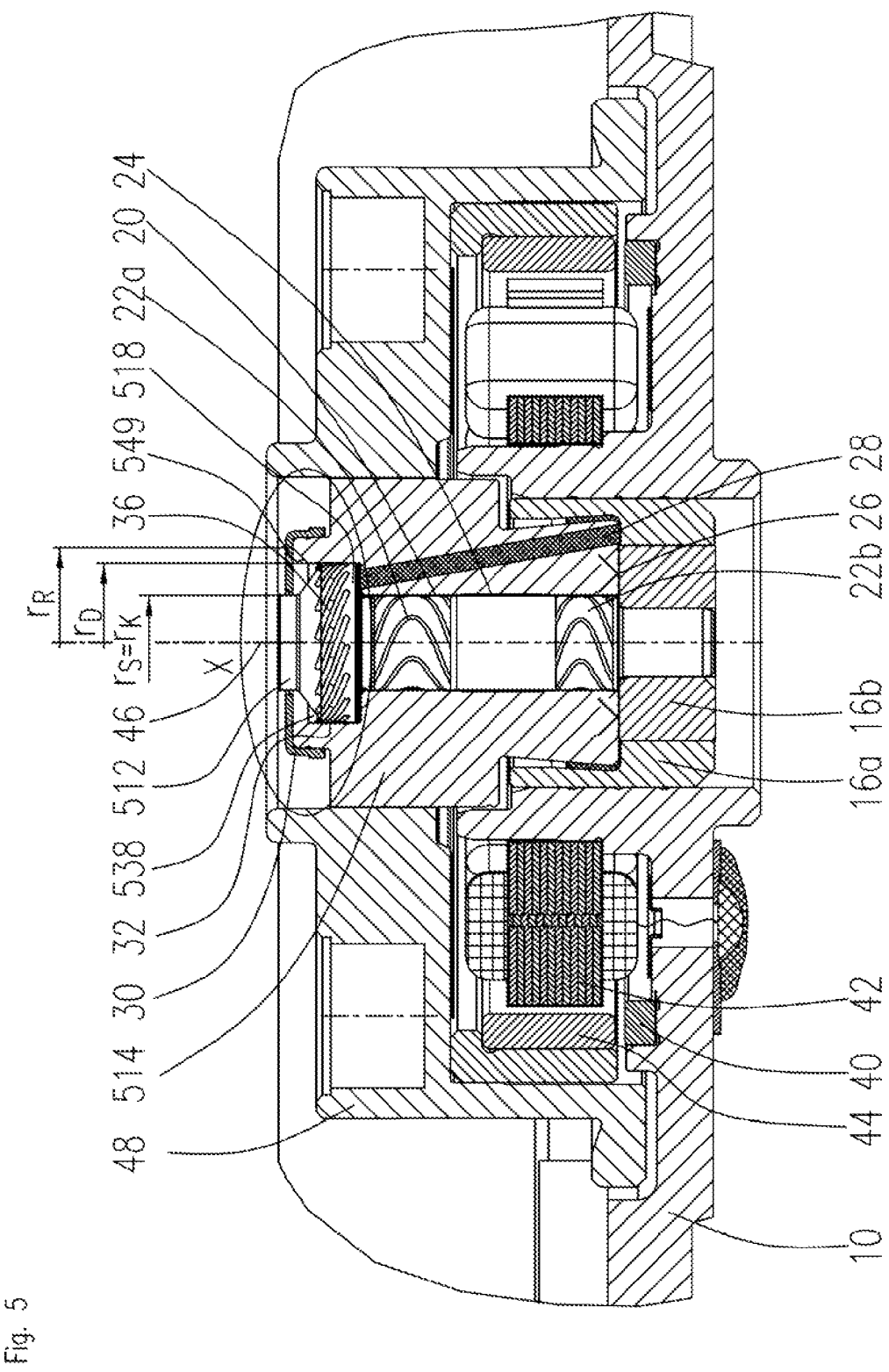
FIG. 5A: shows an enlarged view of region x in FIG. 5
FIG. 6: shows a section through a spindle motor according to a sixth embodiment
Figure 5A:
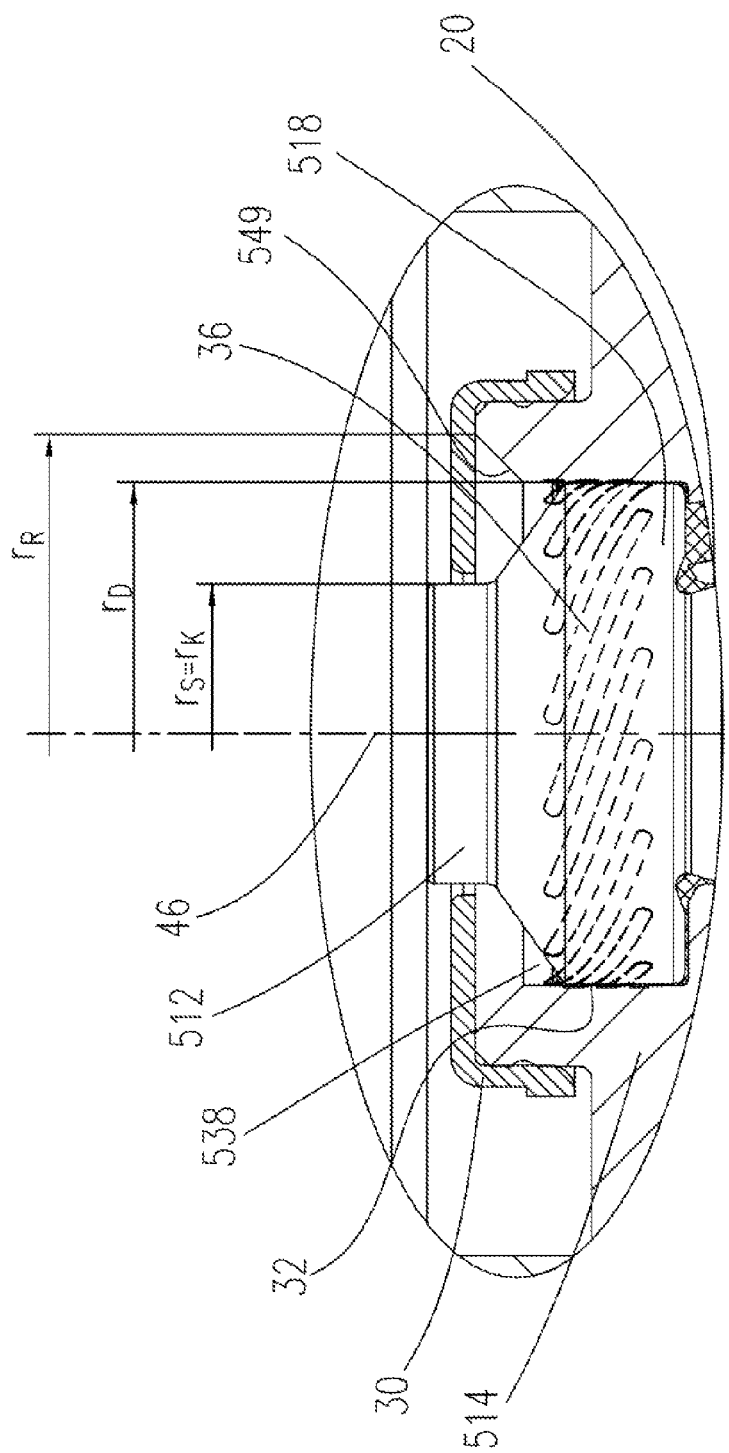

FIGS. 5 and 5A show a section through a spindle motor having a fluid dynamic bearing system similar to the motors of FIGS. 1 and 2. For the basic particulars, the description from FIG. 1 applies.

In contrast to FIG. 1, the region surrounding the reservoir 538 is given a different design. Starting from the sealing gap 32, the reservoir 538 widens out to an approximately tapered cross-section. This is achieved, on the one hand, by the design of the second bearing part 518 whose outer surface above the pumping seal 36 is slanted in the direction of the rotational axis 46 to form a truncated cone. The inner sleeve surface 549 of the bearing bush 514 is slanted to the same extent and points radially outwards. This goes to produce a tapered reservoir 538 widening in cross-section. The slanted surface of the bearing bush 514 is particularly important. When the bearing is being filled, the bearing fluid is filled into the reservoir 538 and sucked into the bearing gap 20 by means of a vacuum found in the bearing gap 20. The slope given to the reservoir 538 in the region of the bearing bush 514 has the effect that the entire bearing fluid flows fully into the bearing gap 20 or the sealing gap 32 and that not a single drop remains in the region of these walls of the bearing bush 514 or the opposing walls of the second bearing part 518. This means that following the filling process, the region 549 of the reservoir 538 need not be cleansed of drops of fluid. Cleaning always brings with it the risk of removing bearing fluid as well from the sealing region, this bearing fluid actually being needed for the reliable operation of the bearing. In the motor of FIG. 1, the second bearing part 18 comprises an annular surface adjacent to the slanting surface of the conical section of the second bearing part 18. The annular surface is arranged perpendicular to the rotational axis. This may bring the risk that bearing fluid remains on the annular surface after the filling procedure.

Advantageously, the second bearing part 518 of the motor of FIG. 5 does not have such an annular surface perpendicular to the rotational axis, so that there is no risk that drops of bearing fluid remain in this region. Here the equation $r_S = r_K$ is valid.

Another difference to FIG. 1 lies in the first bearing part that is formed in two pieces and consists of an outer part 16a and an inner bearing part 16b connected to the outer part 16a and receiving the shaft. The inner bearing part 16b forms the counter bearing to the corresponding axial bearing surface of the bearing bush 514 to create the axial bearing 26. Contiguous to the inside diameter of the bearing part 16b, the shaft 512 has a step that acts as a mechanical stop.

Figure 6:
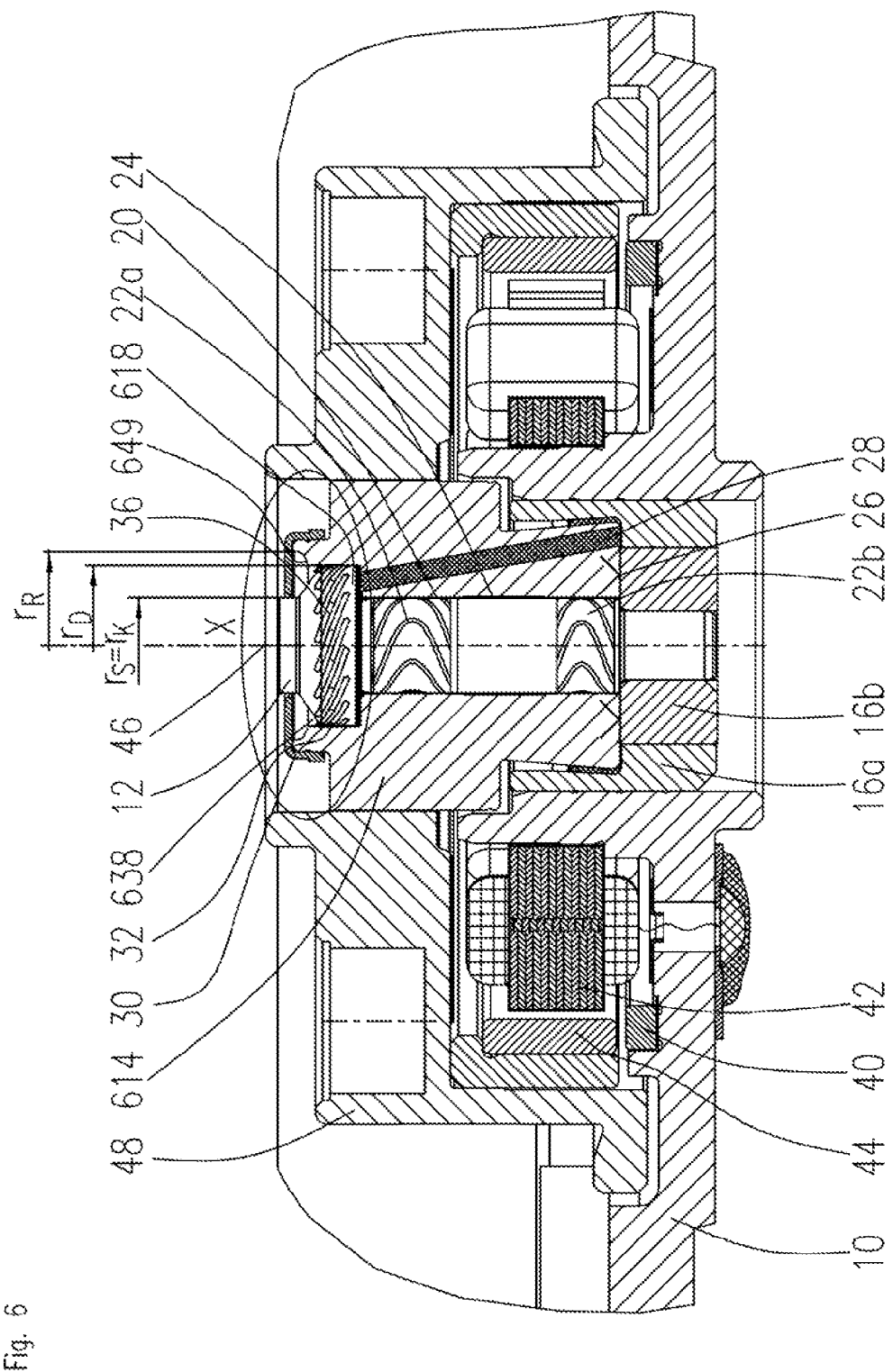
FIG. 6A: shows an enlarged view of region x in FIG. 6
FIG. 7: shows a section through the sealing region of a further embodiment of the fluid bearing

FIGS. 6 and 6A show another embodiment of a fluid dynamic bearing according to the invention for the rotatable support of a spindle motor. Identical parts are indicated by the same reference numbers as in FIG. 1 and the description from FIG. 1 also applies unless otherwise specified.

In contrast to FIG. 1 or FIG. 5, here the radially outer periphery surface of the reservoir 638 is formed with a radius 649. This radius 649 has the same function as the slant 549 of the bearing bush 514 in FIG. 5. The radius 649 of the bearing bush 614 in FIG. 6 makes it easier, when the bearing is being filled, for the bearing fluid to flow from the reservoir 638 into the sealing gap 32 and from there into the bearing gap 20. Due to the radius 649 of the periphery surface of the bearing bush 614, no drops of fluid remain in this region and there is no need to clean the region.

The second bearing part 618 of the motor of FIG. 6 does not have an annular surface perpendicular to the rotational axis as does the bearing part 18 of FIG. 1. This avoids the risk that drops of bearing fluid remain in this region. Here the equation $r_S = r_K$ is valid as well.

The first bearing part is again formed by an outer bearing part 16a and an inner bearing part 16b that also forms the sliding surface of the lower fluid dynamic axial bearing 26.

Figure 7:
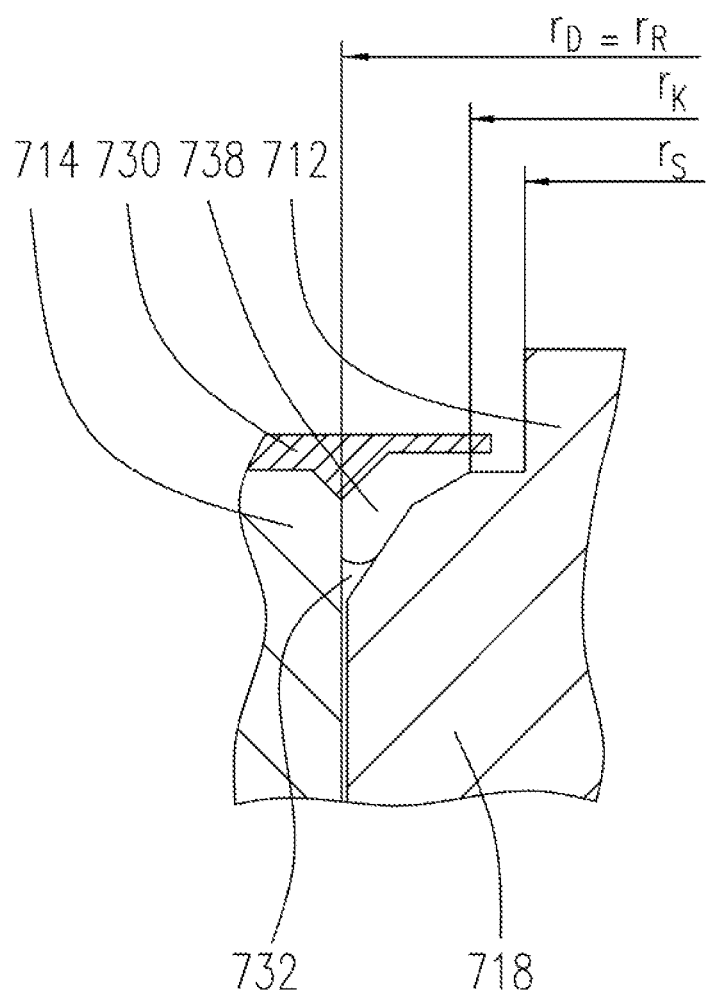

FIG. 7 finally shows a section through the sealing region of a further embodiment of a fluid bearing. Recognizable is the shaft 712 or the second bearing part 718 that represents a part of the shaft or is connected to the shaft. The bearing bush 714 can be seen lying opposite. The shaft and the bearing bush are separated from one another by the sealing gap 732 that is proportionally filled with bearing fluid. The reservoir 738 adjoins above the sealing gap 732. The sealing gap is tapered in cross-section and opens up in the direction of the reservoir 738. The reservoir 738 is closed by a cover 730 that is designed such that it influences the cross-section of the reservoir 738. Starting from the largest diameter of the sealing gap 732, the cross-section of the reservoir 738 is made larger by the design of the bearing part 718 and the design of the cover 730. The sealing effect of the sealing gap 732 is thus reinforced by the sealing effect of the tapered reservoir 738.

IDENTIFICATION REFERENCE LIST

10 Baseplate
12 Shaft
14 Bearing bush
16 First bearing part
16a First bearing part (outer)
16b First bearing part (inner)
18 Second bearing part
20 Bearing gap
22a, 22b Radial bearing 24 Separator gap
26 Axial bearing
28 Recirculation channel
30 Cover
32 Sealing gap
34 Sealing gap
36 Pumping seal
38 Reservoir
40 Ferromagnetic ring
42 Stator arrangement
44 Magnet
46 Rotational axis
48 Hub
50 Bearing disk
114 Bearing bush
138 Reservoir
212 Shaft
218 Second bearing part
238 Reservoir
248 Hub
312 Shaft
318 Second bearing part
332 Sealing gap
338 Reservoir
348 Hub
430 Cover
438 Reservoir
448 Hub
512 Shaft
514 Bearing bush
518 Second bearing part
538 Reservoir
549 Slant
614 Bearing bush
618 Second bearing part
638 Reservoir
649 Radius
712 Shaft
714 Bearing bush
718 Second bearing part
730 Cover
732 Sealing gap
738 Reservoir
$r_D$ Outside radius of the sealing gap
$r_R$ Outside radius of the reservoir
$r_S$ Inside radius of the reservoir
$r_K$ Inside radius of the sealing gap

The invention claimed is:

1. A fluid dynamic bearing system having:
at least one stationary part,
at least one rotating part that is supported rotatable about a rotational axis with respect to the stationary part,
a bearing gap that is formed between the mutually opposing surfaces of the stationary and of the rotating part and filled with a bearing fluid, the bearing gap having two open ends, at least one fluid dynamic radial bearing and at least one fluid dynamic axial bearing that are disposed along sections of the bearing gap, and
sealing means for sealing the open ends of the bearing gap, characterized in that
the sealing means comprises an annular sealing gap that has one end connected to the bearing gap and one end connected to an annular reservoir and a dynamic pumping seal arranged along a section of at least one of the annular sealing gaps,
the sealing gap having a maximum outside radius $r_D$ and a minimum inside radius $r_k$, and the annular reservoir having a maximum outside radius $r_R$ and a minimum inside radius $r_s$, all radii measured from The rotational axis, respectively,
wherein along the section of the pumping seal the inside radius and the outside radius of the sealing gap remain constant,
wherein outside of the pumping seal the sealing gap widens into a taper wherein the inside radius of the sealing gap decreases towards the outside whereas the outside radius remains constant,
and wherein the tapered end of the sealing gap widens towards the outside so that the annular reservoir is formed wherein its outside radius increases, and wherein the maximum outside radius $r_R$ of the annular reservoir being larger than the maximum outside radius $r_D$ of the sealing gap.

2. A fluid dynamic bearing system according to claim 1, wherein the inside radius of the annular reservoir decreases towards the outside such that the minimum inside radius $r_s$ of the annular reservoir being smaller than the minimum inside radius $r_k$ of the sealing gap.

3. A fluid dynamic bearing system according to claim 1, characterized in that the reservoir has a volume that is at least as large as the volume of the entire bearing fluid found in the bearing system.

4. A fluid dynamic bearing system according to claim 1, characterized in that the reservoir is only filled once with bearing fluid when the bearing system is being filled, whereas at other times it is free of bearing fluid.

5. A fluid dynamic bearing system according to claim 1, characterized in that the sealing gap forms a capillary seal.

6. A fluid dynamic bearing system according to claim 1, characterized in that the sealing gap forms a tapered capillary seal.

7. A fluid dynamic bearing system according to claim 1, characterized in that a transition between the maximum outside radius $r_D$ of the sealing gap and the maximum outside radius $r_R$ of the reservoir is made at an angle of >=45 degrees.

8. A fluid dynamic bearing system according to claim 1, characterized in that radially outer surfaces of the reservoir are slanted or have a radius.

9. A fluid dynamic bearing system according to claim 1, characterized in that the stationary part has a first bearing part, a shaft accommodated in the first bearing part and a second annular bearing part disposed on the shaft, the bearing parts being disposed at a mutual spacing on the shaft.

10. A fluid dynamic bearing system according to claim 9, characterized in that the second annular bearing part comprises a cylindrical section and a conical section, wherein the conical section forms a slanting surface that borders the annular reservoir and causes bearing fluid contained in the reservoir to flow back into a sealing region.

11. A fluid dynamic bearing system according to claim 1, characterized in that the rotating part comprises a bearing bush that is rotatably disposed on a shaft between the two bearing parts.

12. A fluid dynamic bearing system according to claim 11, characterized in that the bearing bush comprises a slanting surface that borders the annular reservoir and causes bearing fluid contained in the reservoir to flow back into a sealing region.

13. A fluid dynamic bearing system according to claim 1, characterized in that it comprises at least two fluid dynamic radial bearings that are formed by mutually adjacent surfaces of a shaft and a bearing bush separated from one another by the bearing gap.

14. A fluid dynamic bearing system according to claim 1, characterized in that the fluid dynamic axial bearing is formed by mutually opposing surfaces of the end faces of a first bearing part and a bearing bush.

15. A fluid dynamic bearing system according to claim 1, characterized in that a recirculation channel filled with bearing fluid is provided that connects remote sections of the bearing gap to each other.

16. A fluid dynamic bearing system according to claim 15, characterized. in that the recirculation channel connects sections of the bearing gap adjoining the sealing gaps to each other.

17. A spindle motor having a stator and a rotor and a fluid dynamic bearing system according to claim 1 used for the rotatable support of the rotor that is driven by an electromagnetic drive system.

* * * * *